United States Patent
Kulmer et al.

(10) Patent No.: US 11,656,142 B2
(45) Date of Patent: May 23, 2023

(54) HOLDER FOR A PRESSURE SENSOR

(71) Applicant: MAGNA Energy Storage Systems GesmbH, Sinabelkirchen (AT)

(72) Inventors: Karl-Heinz Kulmer, Gleisdorf (AT); Stefan Fuchs, Graz (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 0 days.

(21) Appl. No.: 17/512,767

(22) Filed: Oct. 28, 2021

(65) Prior Publication Data
US 2022/0146356 A1     May 12, 2022

(30) Foreign Application Priority Data
Nov. 12, 2020   (EP) .................................... 20207088

(51) Int. Cl.
*G01L 19/14*     (2006.01)
*B60K 15/03*     (2006.01)

(52) U.S. Cl.
CPC ............ *G01L 19/147* (2013.01); *B60K 15/03* (2013.01); *B60K 2015/0321* (2013.01)

(58) Field of Classification Search
CPC .................. G01L 19/147; B60K 15/03; B60K 2015/0321
See application file for complete search history.

(56) References Cited

U.S. PATENT DOCUMENTS

| | | | |
|---|---|---|---|
| 5,661,244 A * | 8/1997 | Nishimura | G01L 19/0038 73/706 |
| 5,834,652 A * | 11/1998 | Koshimizu | G01L 19/003 73/756 |
| 5,886,266 A | 3/1999 | Stiller et al. | |
| 5,918,282 A * | 6/1999 | Schwager | B60K 15/035 73/756 |
| 6,035,723 A * | 3/2000 | Rauchhaus | B60K 15/077 73/756 |

(Continued)

FOREIGN PATENT DOCUMENTS

| | | |
|---|---|---|
| DE | 8433084 U1 | 1/1985 |
| DE | 4423095 A1 | 1/1996 |

(Continued)

*Primary Examiner* — Ryan D Walsh
(74) *Attorney, Agent, or Firm* — Jordan IP Law, LLC; Todd A. Vaughn

(57) ABSTRACT

A pressure sensor receptacle for the fastening of a pressure sensor to a motor vehicle tank, and a tank device that includes a pressure sensor receptacle. The pressure sensor receptacle includes a receptacle body having a substantially cylindrical shape with a first axial end forming a fastening portion of the receptacle body, the fastening portion configured for being plugged through an opening of the motor vehicle tank until a first bearing surface of the receptacle body bears against an edge of the opening, wherein the first bearing surface is configured to bound the fastening portion; and a locking body having a second bearing surface, the locking body configured for mounting and locking onto the fastening portion such that the second bearing surface bears against an opposite side of the edge of the opening to thereby clamp the pressure sensor receptacle to the edge of the opening by the receptacle body at one side and by the locking body at another side.

13 Claims, 2 Drawing Sheets

(56) References Cited

U.S. PATENT DOCUMENTS

| | | | | |
|---|---|---|---|---|
| 2004/0149043 A1* | 8/2004 | Kuznia | ............... | G01L 19/0007 |
| | | | | 73/756 |
| 2007/0084510 A1* | 4/2007 | Kaneko | ................ | F16K 24/044 |
| | | | | 137/202 |
| 2019/0039673 A1* | 2/2019 | Hirano | .................... | B62J 37/00 |

FOREIGN PATENT DOCUMENTS

| GB | 2330120 A | 4/1999 |
|---|---|---|
| JP | H04325316 A | 11/1992 |

* cited by examiner

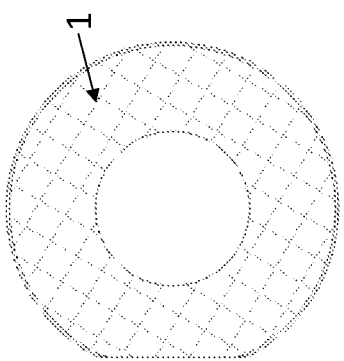
FIG. 3
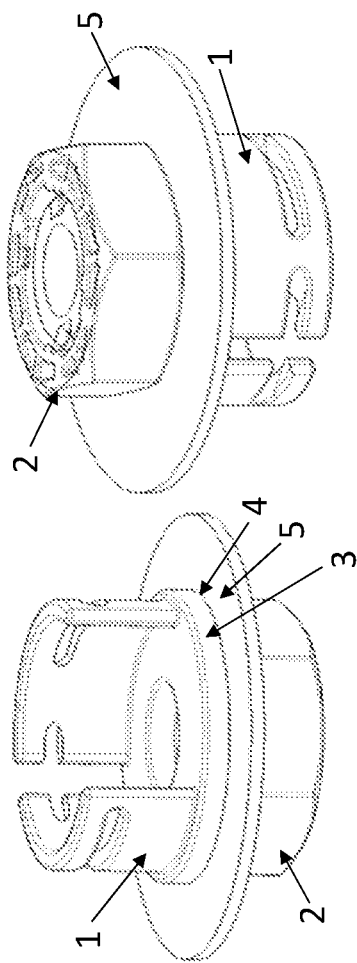
FIG. 1B
FIG. 1A
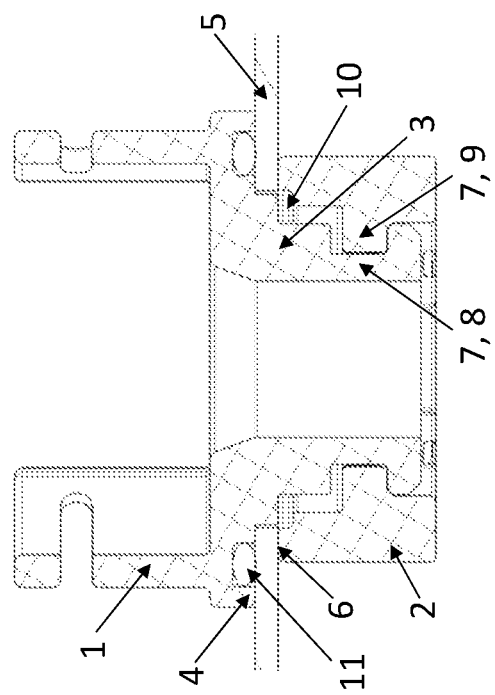
FIG. 2

HOLDER FOR A PRESSURE SENSOR

CROSS-REFERENCE TO RELATED APPLICATIONS

The present application claims priority under 35 U.S.C. § 119 to European Patent Publication No. EP 20207088.4 (filed on Nov. 12, 2020), which is hereby incorporated by reference in its complete entirety.

TECHNICAL FIELD

One or more embodiments relate to a pressure sensor receptacle for the fastening of a pressure sensor to a motor vehicle tank, and to a tank device comprising such a pressure sensor receptacle.

BACKGROUND

It is known that pressure sensors for detecting the pressure in a motor vehicle tank can be installed into the motor vehicle tank. For the fastening of pressure sensors, use may be made of pressure sensor receptacles which can be fastened to the motor vehicle tank, in particular to a motor vehicle tank wall, and which, on the other hand, make it possible for the pressure sensor to be received and fastened in or on the pressure sensor receptacle.

For metal tanks in particular, the production and fastening of pressure sensor receptacles is normally cumbersome and expensive. It is possible for example for pressure sensor receptacles to be milled precisely, and then joined to the metallic tank wall via welding or soldering processes. This is time-consuming and expensive, especially in the case of mass production.

SUMMARY

One or more embodiments relate to a pressure sensor receptacle for the fastening of a pressure sensor to a motor vehicle tank that can be produced and fastened in a simple manner.

One or more embodiments relate to a tank device which is inexpensive to produce and which has a pressure sensor receptacle as set forth, described, and/or illustrated herein.

In accordance with one or more embodiments, a pressure sensor receptacle for fastening a pressure sensor to a motor vehicle tank comprises: a receptacle body having a cylindrical shape with a first axial end forming a fastening portion of the receptacle body, the fastening portion configured for being plugged through an opening of the motor vehicle tank until a first bearing surface of the receptacle body bears against an edge of the opening, wherein the first bearing surface is configured to bound the fastening portion; and a locking body having a second bearing surface, the locking body configured for mounting and locking onto the fastening portion such that the second bearing surface bears against an opposite side of the edge of the opening to thereby clamp the pressure sensor receptacle to the edge of the opening by the receptacle body at one side and by the locking body at another side.

In accordance with one or more embodiments, a pressure sensor receptacle can be fastened to a motor vehicle tank (e.g., a fuel tank), a compensation vessel, or a filler tube of the motor vehicle tank or the compensation vessel, via a locking body as a counterpart element for a receptacle body of the pressure sensor receptacle. The receptacle body can be partially introduced into an opening of the motor vehicle tank, compensation vessel, or tube from one side, in particular, from an outer side of the motor vehicle tank, compensation vessel, or tube. The receptacle body can be fastened to the motor vehicle tank, in particular, to the motor vehicle tank wall, by the locking body on the opposite side of the motor vehicle tank, in particular, on the inner side of the motor vehicle tank. For this purpose, the locking body is mounted onto the fastening portion of the receptacle body and, there, locked, for example, screwed on, in particular, screwed onto the fastening portion of the receptacle body via bayonet geometry.

The pressure sensor receptacle, therefore, does not need to be welded to the motor vehicle tank. It is possible for the construction of the pressure sensor to be simple. The pressure sensor receptacle may be substantially a cylindrical component. The fastening of the pressure sensor receptacle and the production of the motor vehicle tank may be realized inexpensively.

In accordance with one or more embodiments, the motor vehicle tank may comprise a metal tank. The fastening may be realized, for example, at a fuel tank, or at an operating medium tank, or a compensation vessel, or a liquid trap, or a connecting tube (e.g., a filler tube) of the motor vehicle tank. The opening of the motor vehicle tank may be an opening in a tank wall, vessel wall, or tube wall, in particular, composed of metal.

In accordance with one or more embodiments, the locking body can be mounted onto the fastening portion of the receptacle body, and can be locked to the fastening portion via a bayonet fastener. The bayonet fastener comprises at least two axially rising bayonet guides in the fastening portion of the receptacle body and two bars corresponding to the bayonet guides in the locking body. Alternatively, conversely, the bayonet fastener may have two axially rising bayonet guides in the locking body and two bars corresponding to the bayonet guides in the fastening portion of the receptacle body. As a result of the axially rising bayonet guides, the receptacle body and the locking body can be braced against one another to achieve good clamping at the tank and good sealing via a sealing element at the transition to the tank wall.

In accordance with one or more embodiments, between the fastening portion of the receptacle body and the locking body, a device such as, for example, a ratchet fastener, is provided for countering the detachment of the locking body from the receptacle body.

In accordance with one or more embodiments, at the first bearing surface, an encircling seal (e.g., a moulded seal or O-ring seal) is arranged for sealing with respect to the edge of the opening.

In accordance with one or more embodiments, an axial portion of the fastening portion of the receptacle body that is adjacent to the first bearing surface has a non-circular shape, i.e., at least one or more substantially straight edges. That axial portion of the fastening portion which is adjacent to the first bearing surface is situated at that place where the tank wall is situated when installation into the motor vehicle tank is realized. That portion of the receptacle body which is received in the opening of the motor vehicle tank is not circular, just like the edge of the opening is not circular. In this way, it is possible to produce a device for preventing rotation of the pressure sensor receptacle.

In accordance with one or more embodiments, the locking body has an outer contour in the shape of a nut, in particular, a hexagon.

In accordance with one or more embodiments, a pressure sensor is fastened to a second axial end of the receptacle body, which second axial end is situated opposite the first axial end of the receptacle body.

In accordance with one or more embodiments, a tank device comprises a motor vehicle tank and a pressure sensor receptacle for fastening a pressure sensor to a motor vehicle tank. The pressure sensor receptacle include a receptacle body having a substantially cylindrical shape with a first axial end forming a fastening portion of the receptacle body, the fastening portion configured for being plugged through an opening of the motor vehicle tank until a first bearing surface of the receptacle body bears against an edge of the opening, wherein the first bearing surface is configured to bound the fastening portion; and a locking body having a second bearing surface, the locking body configured for mounting and locking onto the fastening portion such that the second bearing surface bears against an opposite side of the edge of the opening to thereby clamp the pressure sensor receptacle to the edge of the opening by the receptacle body at one side and by the locking body at another side.

DRAWINGS

One or more embodiments will be illustrated by way of example in the drawings and explained in the description below.

FIG. 1A illustrates a three-dimensional view of a pressure sensor receptacle in a motor vehicle tank from the inside, in accordance with one or more embodiments.

FIG. 1B illustrates a three-dimensional view of the pressure sensor receptacle of FIG. 1A from the outside.

FIG. 2 illustrates a sectional side view of the pressure sensor receptacle of FIG. 1A.

FIG. 3 illustrates a sectional view of the pressure sensor receptacle of FIG. 2 from the inside, in a plane of the opening of the motor vehicle tank.

DESCRIPTION

Figure 5:
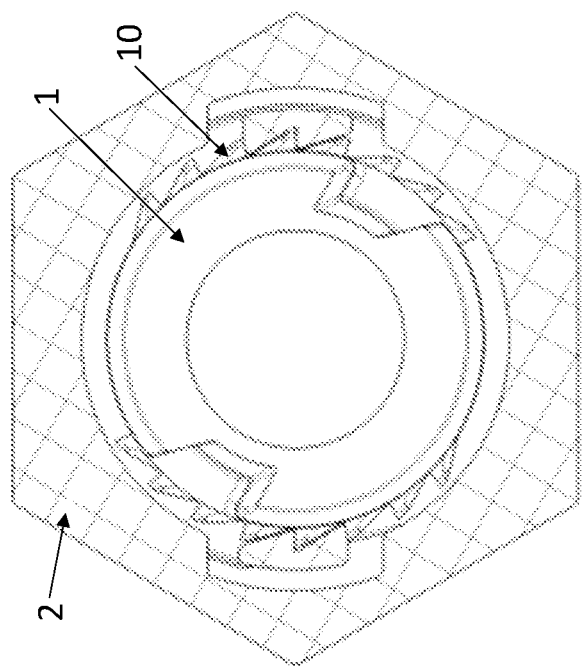
FIG. 5 illustrates a sectional view of the pressure sensor receptacle of FIG. 2 from the inside, in a plane of a ratchet fastener.

FIGS. 1A, 1B, and 2 illustrate a pressure sensor receptacle in a motor vehicle tank, in accordance with one or more embodiments. The pressure sensor receptacle comprises a substantially cylindrical receptacle body 1 and a locking body 2. The receptacle body 1 receives a pressure sensor, while the locking body 2 serves as a counterpart for fastening the receptacle body 1 to the motor vehicle tank. A first axial end of the receptacle body 1 forms a fastening portion of the receptacle body 1, which fastening portion is plugged through an opening 3 of a tank wall of the motor vehicle tank. Of the tank wall, merely the edge 5 around the opening 3 is illustrated.

A first bearing surface 4, bounding the fastening portion, of the receptacle body 1 bears against the edge 5 of the opening 3, i.e., against the tank wall forming the edge around the opening 3.

Figure 4:
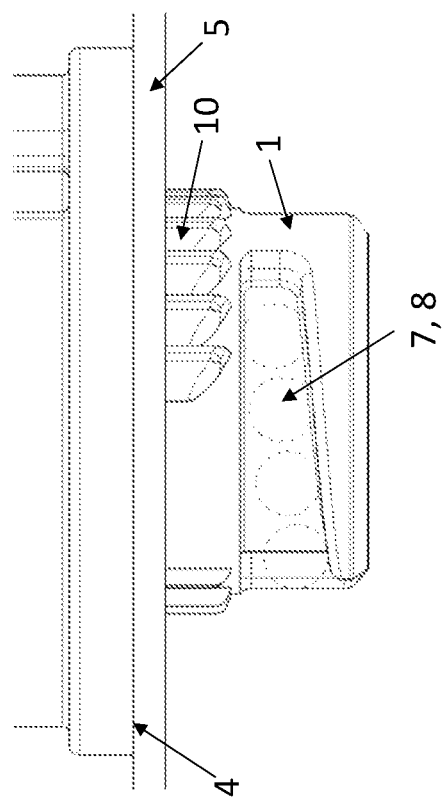
FIG. 4 illustrates a partial view of the pressure sensor receptacle of FIG. 2 illustrates from the side, without the locking body.

The locking body 2 is mounted onto the fastening portion of the receptacle body 1, and is locked to the fastening portion, via a bayonet fastener 7, which is illustrated in more detail in FIG. 4. A second bearing surface 6 of the locking body 2 bears against the opposite side of the edge 5 of the opening 3, with the result that the pressure sensor receptacle is clamped, and thereby fastened, to the edge 5 of the opening 3 of the tank wall by the receptacle body 1 at one side and by the locking body 2 at the other side.

An annular seal 11, arranged at the first bearing surface 4 to encircle the opening 3, serves for sealing with respect to the edge 5 of the opening 3. The locking body 2 has an outer contour in the shape of a nut, in particular, a hexagon, so that the locking body 2 can be simply screwed onto the receiving body 1.

FIG. 3 illustrates an axial portion of the fastening portion of the receptacle body that is adjacent to the first bearing surface 4 has a non-circular shape. This axial portion is arranged at the opening 3 radially at the inside. The opening 3 has a corresponding shape to the axial portion. The pressure sensor receptacle is thereby secured against rotation.

As clearly illustrated in FIG. 4, the bayonet fastener 7 comprises at least two axially rising bayonet guides 8, i.e., bayonet geometries, in the fastening portion of the receptacle body 1 and two bars 9 corresponding to the bayonet guides 8 in the locking body 2 (FIG. 2).

FIG. 5 finally illustrates that, between the fastening portion of the receptacle body 1 and the locking body 2, there is configured a ratchet fastener 10 for countering the detachment of the locking body 2 from the receptacle body 1. During the production of the motor vehicle tank, it is thereby possible for the receptacle body 1 of the pressure sensor receptacle to be to be plugged through a matching opening 3 of a respective metallic tank component and to be locked in a non-detachable manner on the other side via the locking body 2. Due to the specific shape of the pressure sensor receptacle and of the opening 3 in the tank component, the connection is secured against rotation. The sealing between pressure sensor receptacle and tank component is realized by the seal 11, in particular, an O-ring or a moulded seal.

The fitting of the pressure sensor receptacle is realized with the aid of the locking body 2, which engages into the rising bayonet geometry 8 via two bars 9 situated opposite one another and thereby braces and seals the interface of pressure sensor receptacle or receptacle body 1—seal 11—tank component (represented as edge 5). Owing to the rising bayonet geometry 8, the solution in accordance with one or more embodiments may be used for different wall thicknesses of the tank component.

The locking body 2 is secured against detachment of the connection by a radially attached ratchet fastener 10. Consequently, self-detachment of the connection during operation, for example as a result of vibrations during driving, is not possible and the tightness of the system is secured.

Instead of welding or soldering, the pressure sensor receptacle described is fitted via a non-detachable bayonet connection or bayonet fastener.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Receptacle body
2 Locking body
3 Opening (tank wall)
4 First bearing surface
5 Edge (tank wall)
6 Second bearing surface
7 Bayonet fastener
8 Bayonet guide
9 Bar
10 Ratchet fastener
11 Seal

What is claimed is:

1. A pressure sensor receptacle for fastening a pressure sensor to a motor vehicle tank, the pressure sensor receptacle comprising:
a receptacle body having a substantially cylindrical shape with a first axial end forming a fastening portion configured for being plugged through an opening of the motor vehicle tank until a first bearing surface of the receptacle body bears against an edge of the opening, the fastening portion including a bayonet fastener having two axially rising bayonet guides and two bars, wherein the first bearing surface is configured to bound the fastening portion;
a locking body having bayonet guides therein that correspond to the at least two axially rising bayonet guides and the two bars to mount and lock the locking body onto the fastening portion such that a second bearing surface of the locking body bears against an opposite side of the edge of the opening to thereby clamp the pressure sensor receptacle to the edge of the opening at one side of the edge of the opening and by the locking body at another side of the edge of the opening; and
a ratchet fastener arranged between the fastening portion and the locking body to counter detachment of the locking body from the receptacle body.

2. The pressure sensor receptacle of claim 1, further comprising an encircling seal, arranged at the first bearing surface, configured to seal the edge of the opening.

3. The pressure sensor receptacle of claim 1, wherein an axial portion of the fastening portion that is adjacent to the first bearing surface has a non-circular shape.

4. The pressure sensor receptacle of claim 1, wherein the locking body has an outer contour with a hexagonal shape.

5. The pressure sensor receptacle of claim 1, further comprising a pressure sensor fastened to a second axial end of the receptacle body, the second axial end being situated opposite the first axial end of the receptacle body.

6. A tank device, comprising:
a motor vehicle tank; and
a pressure sensor receptacle for fastening a pressure sensor to the motor vehicle tank, the pressure sensor receptacle including:
a receptacle body having a substantially cylindrical shape with a first axial end forming a fastening portion configured for being plugged through an opening of the motor vehicle tank until a first bearing surface of the receptacle body bears against an edge of the opening, the fastening portion including a bayonet fastener having two axially rising bayonet guides and two bars, wherein the first bearing surface is configured to bound the fastening portion;
a locking body having bayonet guides therein that correspond to the at least two axially rising bayonet guides and the two bars to mount and lock the locking body onto the fastening portion such that a second bearing surface of the locking body bears against an opposite side of the edge of the opening to thereby clamp the pressure sensor receptacle to the edge of the opening at one side of the edge of the opening and by the locking body at another side of the edge of the opening; and
a ratchet fastener arranged between the fastening portion and the locking body to counter detachment of the locking body from the receptacle body.

7. The tank device of claim 6, wherein the fastening portion is plugged through the opening of a tank wall of the motor vehicle tank.

8. The tank device of claim 6, wherein the fastening portion is plugged through the opening of a tube wall of the motor vehicle tank.

9. The tank device of claim 6, further comprising an encircling seal, arranged at the first bearing surface, configured to seal the edge of the opening.

10. The tank device of claim 6, wherein an axial portion of the fastening portion that is adjacent to the first bearing surface has a non-circular shape.

11. The tank device of claim 6, wherein the locking body has an outer contour with a hexagonal shape.

12. The tank device of claim 6, further comprising a pressure sensor fastened to a second axial end of the receptacle body, the second axial end being situated opposite the first axial end of the receptacle body.

13. A pressure sensor receptacle for fastening a pressure sensor to a motor vehicle tank, the pressure sensor receptacle comprising:
a receptacle body which holds the pressure sensor, the receptacle body having a first axial end forming a fastening portion extending through an opening of a wall of the motor vehicle tank until a first bearing surface of the receptacle body bears against an outer side of the wall of the motor vehicle tank such that the fastening portion is arranged in the motor vehicle tank, the fastening portion including a bayonet fastener having two axially rising bayonet guides and two bars;
a locking body having bayonet guides therein that correspond to the at least two axially rising bayonet guides and the two bars to mount and lock the locking body onto the fastening portion to fasten the receptacle body in the motor vehicle tank, the locking body having a second bearing surface that bears against an inner side of the wall to clamp the pressure sensor receptacle at the opening, the inner side of the wall being opposite to the outer side of the wall; and
a ratchet fastener radially attached to the receptable body and arranged between the fastening portion and the locking body to counter detachment of the locking body from the receptacle body.

\* \* \* \* \*